(12) United States Patent
Kubo et al.

(10) Patent No.: US 12,246,474 B2
(45) Date of Patent: Mar. 11, 2025

(54) CONTROL SYSTEM FOR APPARATUS FOR TAKING OUT MOLDED PRODUCT THAT DETECTS COLLISION BASED ON TORQUE

(71) Applicant: Yushin Precision Equipment Co., Ltd., Kyoto (JP)

(72) Inventors: Sanai Kubo, Kyoto (JP); Fumitake Watanabe, Kyoto (JP)

(73) Assignee: YUSHIN PRECISION EQUIPMENT CO., LTD., Kyoto (JP)

( * ) Notice: Subject to any disclaimer, the term of this patent is extended or adjusted under 35 U.S.C. 154(b) by 357 days.

(21) Appl. No.: 17/542,866

(22) Filed: Dec. 6, 2021

(65) Prior Publication Data

US 2022/0176596 A1 Jun. 9, 2022

(30) Foreign Application Priority Data

Dec. 7, 2020 (JP) .................................. 2020-202992

(51) Int. Cl.
*B29C 37/00* (2006.01)

(52) U.S. Cl.
CPC .... *B29C 37/0007* (2013.01); *B29C 2037/903* (2013.01); *B29C 2037/94* (2013.01)

(58) Field of Classification Search
CPC .......... B29C 37/0007; B29C 2037/903; B29C 2037/94; B29C 2945/76023; B29C 2945/76317; B29C 2945/76568; B29C 2945/76899; B29C 45/76; B29C 45/84; B29C 2045/7633; B29C 2945/76421;
(Continued)

(56) References Cited

U.S. PATENT DOCUMENTS 5,204,598 A * 4/1993 Torii ........................ B25J 19/06
318/563
2012/0330456 A1* 12/2012 Tsuda ................. G05B 19/4061
700/186
(Continued)

FOREIGN PATENT DOCUMENTS

EP 0464211 A1 1/1992
EP 1046470 A2 10/2000
(Continued)

OTHER PUBLICATIONS

JP-3079047-B2 English translation (Year: 2000).*
(Continued)

*Primary Examiner* — Kamini S Shah
*Assistant Examiner* — Jonathan Michael Skrzycki
(74) *Attorney, Agent, or Firm* — Rankin, Hill & Clark LLP

(57) ABSTRACT

There is provided a control system for an apparatus for taking out a molded product, the apparatus performing appropriate operation when a collision occurs while a servo system control section is manually operated. When a collision detection section outputs an operation stop command, a deviation clearing section performs clearing operation to bring deviations in a servo system control section to zero with the servo system control section kept on. Positioning is completed as the deviations are brought to zero, which enables operation to be performed again. When a retracting operation is performed after the operation is stopped, servomotors are operated according to an operation command, which allows smooth retraction from the collision state.

18 Claims, 4 Drawing Sheets

(58) Field of Classification Search
CPC .......... B29C 2945/76795; B29C 2945/76943; B29C 45/42; B29C 37/0003; B29C 2037/90; G05B 2219/45137; G05B 19/4062; B65G 43/08; B65G 47/74; B65G 2203/0283; B65G 2203/0291
See application file for complete search history.

(56) References Cited

U.S. PATENT DOCUMENTS

| | | | | |
|---|---|---|---|---|
| 2016/0354925 | A1* | 12/2016 | Shimodaira | B25J 9/1633 |
| 2020/0215735 | A1* | 7/2020 | Wang | G06F 8/34 |
| 2021/0087958 | A1* | 3/2021 | Uehara | F01N 3/208 |
| 2021/0354358 | A1* | 11/2021 | Kodaira | B29C 45/0433 |
| 2022/0118614 | A1* | 4/2022 | Bretschneider | G05B 19/4061 |

FOREIGN PATENT DOCUMENTS

| | | | | |
|---|---|---|---|---|
| EP | 1046470 B1 * | 4/2006 | | B25J 9/1676 |
| JP | 11-77580 A | 3/1999 | | |
| JP | 3079047 B2 * | 8/2000 | | B29C 45/84 |
| JP | 3526555 | 5/2004 | | |
| JP | 2015-217468 A | 12/2015 | | |
| JP | 2017-30058 A | 2/2017 | | |
| WO | WO-2009128156 A1 * | 10/2009 | | G05B 19/4061 |

OTHER PUBLICATIONS

WO-2009128156-A1 English translation (Year: 2009).*
Japanese Office Action dated Jul. 31, 2024, issued in the corresponding Japanese Application No. 2020-202992; English machine translation included, 11 pages.

* cited by examiner

CONTROL SYSTEM FOR APPARATUS FOR TAKING OUT MOLDED PRODUCT THAT DETECTS COLLISION BASED ON TORQUE

TECHNICAL FIELD

The present invention relates to a control system for an apparatus for taking out a molded product, the apparatus being capable of performing appropriate retracting operation when a collision occurs during a manual operation.

BACKGROUND ART

Japanese Patent No. 3526555 discloses an apparatus for taking out a molded product, the apparatus being capable of preventing damage to the molded product by preventing deformation of a member to which a chuck portion is attached, even when an excessive external force acts on the chuck portion. In this invention, the chuck portion is kept stationary at a predetermined position by locking electric motors using a DC current when the chuck portion is moved to the predetermined position, and the chuck portion is rendered movable by an external force by performing control so as to decrease the DC locking force of the electric motors when a collision detection sensor detects application of an external force to the chuck portion which has been kept stationary.
[Patent Document 1] Japanese Patent No. 3526555

SUMMARY OF INVENTION

Technical Problem

However, it is practically difficult, and leads to a significant cost increase as well, to attach a sensor exclusively for collision detection or a sensor exclusively for collision retraction to the entire frame of the apparatus including the take-out head. It is also difficult to predict where a collision occurs in work environments and work situations. Therefore, in practice, a worker may inadvertently cause the take-out head to collide with a die or a peripheral device (neighboring objects) by performing an erroneous operation during manually operating the apparatus, and damage the take-out head, a track roller as a guide portion, and a fixed plate because of a retracting operation after the collision.

It is an object of the present invention to provide a control system for an apparatus for taking out a molded product, the control system being capable of performing appropriate operation to prevent damage when a collision occurs while a worker is manually operating the apparatus.

Solution to Problem

The present invention improves a control system for an apparatus for taking out a molded product, including: a servo system control section configured to detect, using an encoder, a position and a speed of a drive portion of a servomotor operable to drive a frame including a take-out head of the apparatus, to calculate a deviation between a detected value of the position and a value of a position command and a deviation between a detected value of the speed and a value of a speed command, and to control the servomotor by performing feedback control on the position and the speed of the drive portion using the deviation; and a manual command generation section configured to generate a manual command for manually operating the servo system control section. The control system according to the present invention further includes a torque detection section, a collision detection section, and a deviation clearing section in order to perform appropriate operation when a collision occurs. The torque detection section detects torque applied to the frame when the servomotor is manually operated by providing an operation command to the servo system control section according to the manual command output from the manual command generation section. The collision detection section outputs an operation stop command by assuming that the take-out head has collided with a peripheral or neighboring object when a value detected by the torque detection section becomes larger than a predetermined value. The deviation clearing section performs clearing operation to bring the deviations in the servo system control section to zero, keeping the servo system control section on when the operation stop command is output.

In the current state of the art, an overload error is caused and the servomotor is stopped when the motor torque value reaches 300%, for example, as the take-out head of the vertical frame collides with a die etc. during a manual operation. In this event, the servo system control section turns off the servomotor, and therefore it is necessary that the servo system control section should turn on the servomotor again in order to retract from the collision state. When the servo system control section turns off the servomotor, the position deviation is brought to zero, and the take-out head is slightly descended while contacting the die etc., which may damage the take-out head. When an erroneous manual operation is performed when the servomotor is turned on during retracting operation, the take-out head may collide with the die again, or a load may be applied to deform the vertical frame or the take-out head. In some cases, the servomotor is turned off again, and an escape may not be made from the collision state.

With the present invention, the deviation clearing section performs clearing operation to bring the deviations in the servo system control section to zero with the servo system control section kept on when the operation stop command is output. Therefore, positioning is completed as the deviations are brought to zero, which enables operation to be performed again. As a result, when a retracting operation is performed after the operation is stopped, the servomotor can be operated according to an operation command to move the vertical frame and the take-out head, which allows smooth retraction from the collision state.

Preferably, the collision detection section is configured to set the predetermined value to a value that is smaller than a limit value during automatic operation. Consequently, it is possible to prevent a load that is more than necessary from being applied to the peripheral or neighboring object because of the difference in the manual operation by the worker.

Preferably, the collision detection section is configured to output the operation stop command by assuming that the take-out head has collided with the peripheral or neighboring object when the collision detection section detects continuously for a predetermined time that the value detected by the torque detection section is larger than the predetermined value. With this configuration, noise is not detected when the detected value is larger than the predetermined value because of the noise, and thus the occurrence of a "collision" can be accurately detected.

Preferably, the collision detection section is configured to output an alarm signal almost at the same time as outputting the operation stop command, and continuously output the alarm signal until a predetermined time elapses after a movement command is input again from the manual command generation section to the servo system control section while the take-out head is retracting after a collision has been detected and the value detected by the torque detection section becomes smaller than the predetermined value. If the alarm is turned off almost at the same time as the value detected by the torque detection section becomes smaller than the predetermined value, the take-out head may not be completely retracted from the collision state if the worker stops the manual operation almost at the same time. Therefore, outputting the alarm signal until the predetermined time elapses allows the worker to continue the manual operation and the take-out head to be completely retracted from the collision state.

Preferably, the deviation clearing section is configured to perform the clearing operation again when the movement command is input again from the manual command generation section. With this configuration, deviation data can be reliably cleared before performing retracting operation. In addition, the movement command is not input with slight deviations remaining. Thus, it is possible to prevent the risk of the occurrence of a collision again due to operation with overshoot or undershoot when feedback control is performed so as to abruptly bring slight deviations to zero.

Preferably, the torque detection section is configured to detect at least one action direction of torque that acts on the take-out head, and a display portion of an input section that is used to perform the manual operation is configured to display the action direction of the torque and a torque indication that is proportional to a magnitude of the torque. Such a torque indication may be displayed in any manner such as numerical display, bar-graph display, and meter display. This configuration allows an operator to correctly determine, based on data, torque in which direction should be reduced through retraction when retracting operation is performed.

Preferably, the display portion is configured to display a suggestion indication adjacent to the torque indication, the suggestion indication suggesting a direction of retraction. This suggestion may be any of a text indication, a mark indication, a lamp indication, etc. Such an indication allows even an unskilled operator to easily perform retracting operation after a collision.

Preferably, the torque detection section is configured to detect torque in the transverse direction, torque in the pull-put direction, and torque in the vertical direction when servomotors are used for drive in three-axis (XVZ) directions. When servomotors are provided for a large number of axes such as five axes and six axes, the torque detection section is preferably configured to detect torque for all the large number of axes. When the take-out head is mounted to a posture controller, the torque detection section is preferably configured to detect torque applied from the posture controller to the take-out head as well.

The display portion may be configured to display three suggestion indications adjacent to the three torque indications, the suggestion indications each suggesting a direction of retraction. Such indications allow an operator to correctly determine, based on data, torque in which direction should be reduced through retraction when retracting operation is performed after a collision.

DESCRIPTION OF EMBODIMENTS

Figure 1:
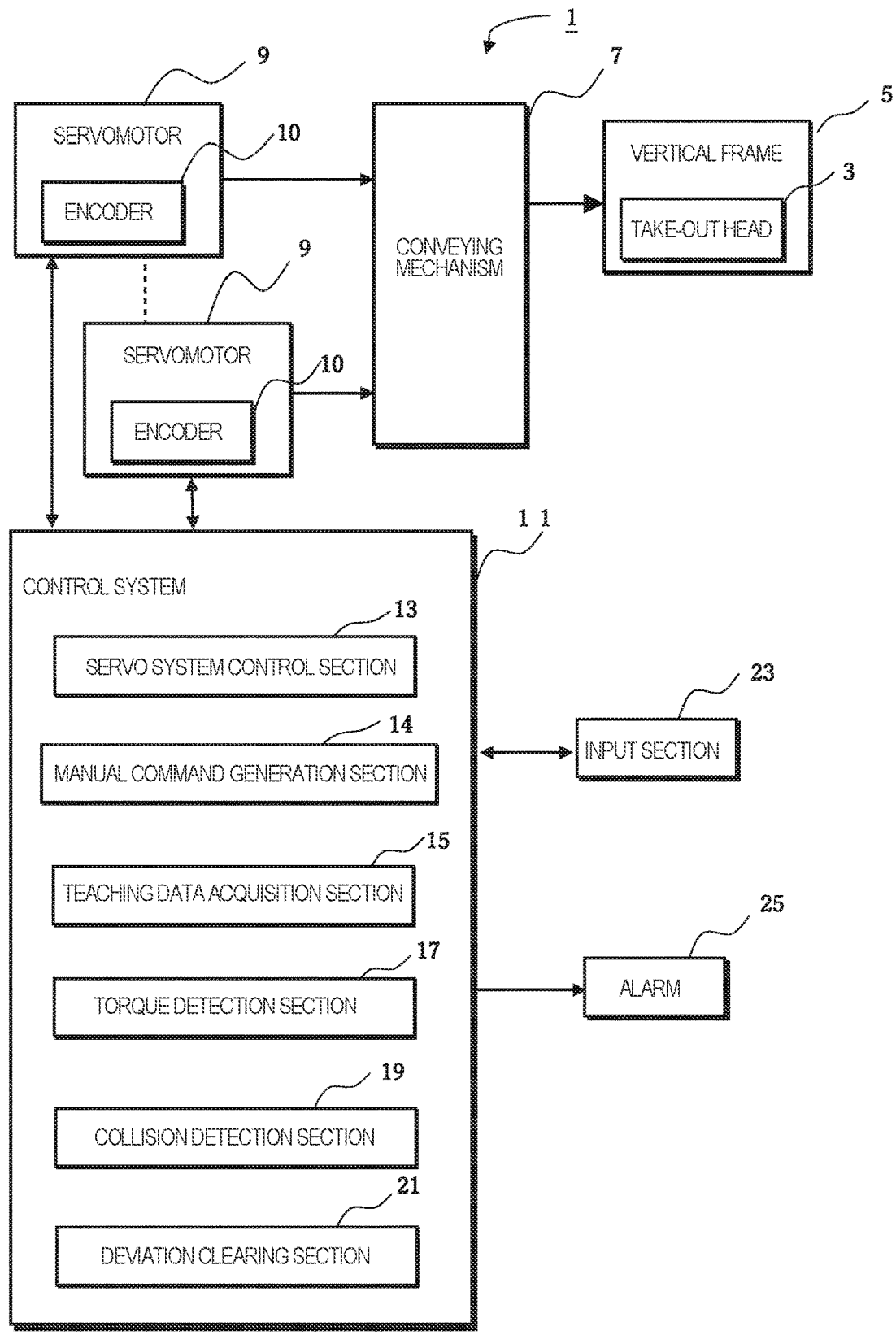
FIG. 1 is a block diagram illustrating a schematic configuration of an apparatus for taking out a molded product according to an embodiment of the present invention.
Figure 2:
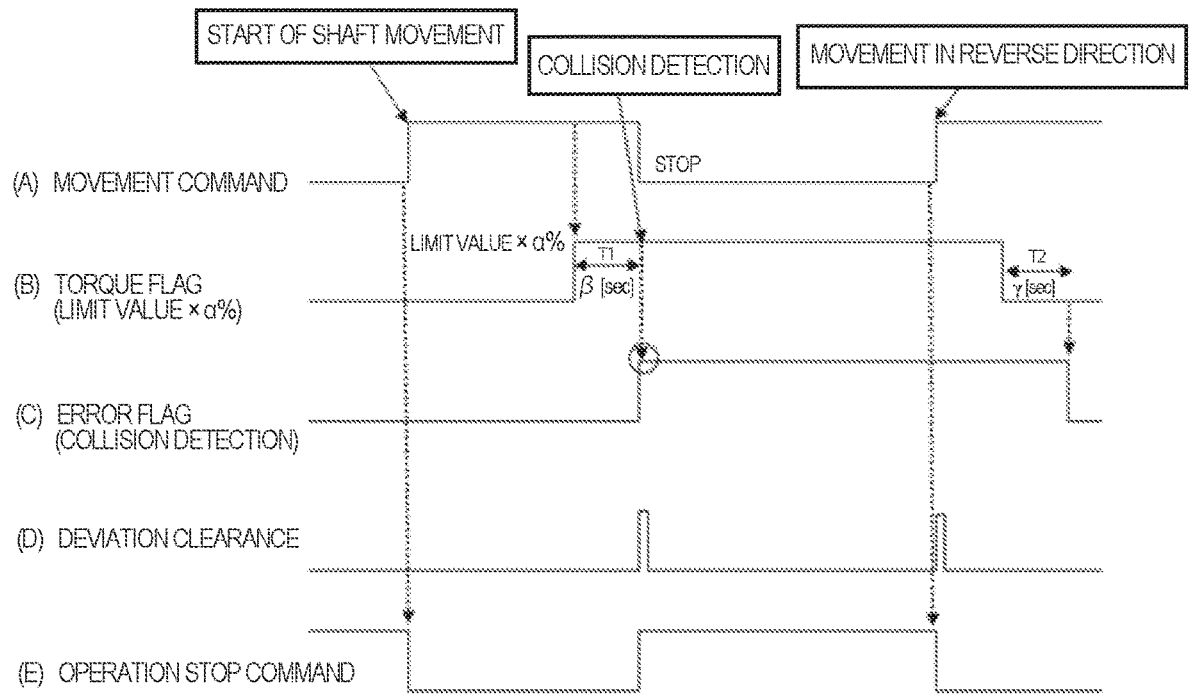
FIG. 2 is a time chart, specifically before and after detection of a collision, according to the present embodiment.
Figure 3:
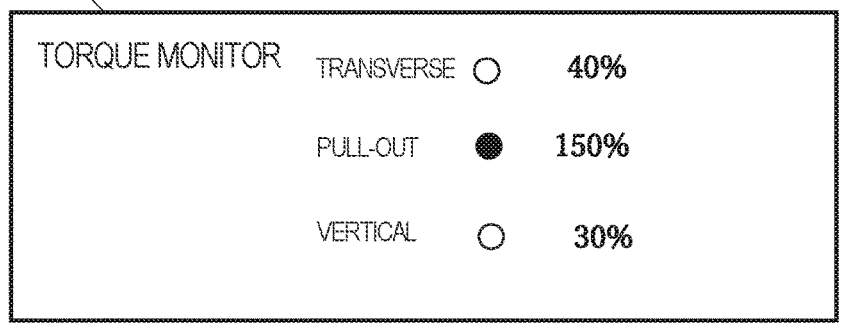
FIG. 3 illustrates an example of display on an input section.

An embodiment of the present invention will be described in detail below with reference to the drawings. FIG. 1 is a block diagram illustrating a schematic configuration of an apparatus 1 for taking out a molded product according to an embodiment of the present invention. FIG. 2 is a time chart, specifically before and after detection of a collision, according to the present embodiment. FIG. 3 illustrates an example of display on an input section 23. The apparatus 1 conveys a vertical frame 5 using a conveying mechanism 7 with three orthogonal axes. The vertical frame 5 includes, at its distal end, a take-out head 3 operable to go into a mold of a molding machine and take out a molded product. A plurality of servomotors 9 with an encoder 10 are used as drive sources for the conveying mechanism 7. A control system 11 configured to control the plurality of servomotors 9 includes a servo system control section 13 provided for the plurality of servomotors 9. The servo system control section 13 calculates the deviation between a detected value of a position detected by the encoder 10 and the value of a position command and the deviation between a detected value of a speed detected by the encoder 10 and the value of a speed command, and performs feedback control on the position and the speed of drive shafts of the servomotors 9, as a drive portion, using the deviations. The servo system control section 13 functions as a so-called servoamplifier.

In the present embodiment, the control system 11 includes a manual command generation section 14, a teaching data acquisition section 15, a torque detection section 17, a collision detection section 19, and a deviation clearing section 21. The manual command generation section 14 generates a manual command for manually operating the servo system control section 13. The teaching data acquisition section 15 acquires and stores teaching data by performing operation necessary to perform appropriate operation during teaching. As illustrated in FIG. 2, the torque detection section 17 detects torque [see (B) in FIG. 2] applied to the vertical frame 5 or the take-out head 3 when the servomotor 9 is manually operated as the manual command generation section 14 provides a movement command [see (A) in FIG. 2] to the servo system control section 13 through a manual operation input from the input section 23. In the present embodiment, the torque detection section 17 is configured to detect torque in the transverse direction, torque in the pull-put direction, and torque in the vertical direction that act on the take-out head 3. The torque may be detected by measuring a motor current, or may be detected using a torque sensor. In the present embodiment, as illustrated in FIG. 3, three torque indications (indications of "40%", "150%", and "30%" in FIG. 3) that are proportional to the magnitude of the torque in the transverse direction, the torque in the pull-put direction, and the torque in the vertical direction are displayed on a display screen of a display portion 24 of the input section 23 which serves as a controller that is used to input a manual operation. In addition, the display screen of the display portion 24 is configured to display three suggestion indications (a white circular mark and a black circular mark in FIG. 3) adjacent to the three torque indications, the suggestion indications each suggesting the direction of retraction. The suggestion indications may be any of text indications, mark indications, lamp indications, etc. Such indications allow an operator to correctly determine, based on data, torque in which direction should be reduced through retraction when retracting operation is performed after a collision. The indications also allow even an unskilled operator to easily perform retracting operation after a collision.

The collision detection section 19 outputs an operation stop command by assuming that the take-out head 3 has collided with a peripheral or neighboring object when a value detected by the torque detection section 17 becomes larger than a predetermined value. In the present embodiment, as illustrated in (B) in FIG. 2, the collision detection section 19 sets the predetermined value to a value (limit value×α %; e.g. α=50%) that is smaller than a limit value (e.g. 300% of rated torque) during automatic operation. Determining the predetermined value in this manner prevents application of a load that is more than necessary to a peripheral or neighboring object at the time of a collision or during retracting operation by a manual operation performed during work such as teaching or while performing retracting operation after a collision. In the present embodiment, in addition, the collision detection section 19 outputs an operation stop command [see (E) in FIG. 2] by assuming that the take-out head 3 has collided with a peripheral or neighboring object when the collision detection section 19 detects continuously for a predetermined time T1 [see "β seconds" in (B) in FIG. 2] that the value detected by the torque detection section 17 is larger than the predetermined value. If a collision is immediately determined when the torque has become more than the predetermined value, a collision may be erroneously determined when a tapping operation is performed etc. Therefore, the occurrence of a collision is determined when the torque is continuously more than the limit value×α % also after a period of β seconds (specifically 0.2 to 0.3 seconds) has elapsed.

Further, the collision detection section 19 outputs an alarm signal [see the error flag in (C) in FIG. 2] almost at the same time as the operation stop command is output. After that, the alarm signal [error flag in (C) in FIG. 2] is continuously output until a predetermined time [see γ seconds in (B) in FIG. 2] elapses (time T2) after the value detected by the torque detection section 17 becomes smaller than the predetermined value (after the flag is set to 0) after a movement command is input again (the timing of "movement in reverse direction" in (A) in FIG. 2 is reached) from the manual command generation section 14 to the servo system control section 13 by operating the input section 23, in order to perform a retracting operation. The limit value×α % does not immediately become zero, since the torque is gradually reduced to zero from the collision state, even if a movement command for "movement in reverse direction" is input. An alarm 25 generates an alarm for the worker through a sound, an image, etc. while the alarm signal is output. The stand-by time T2 of γ seconds is set in order to give the worker a chance to perform a retracting operation again when the worker has performed an erroneous retracting operation. That is, when the torque in the pull-put direction is high because of a collision, it is necessary to move the vertical frame 5 in the direction of bringing the torque in the pull-put direction to zero. If the worker performs a manual operation to move the vertical frame 5 in the vertical direction, however, the vertical frame 5 may be moved in the vertical direction with the take-out head 3 strongly pressed against a colliding object, which may break the take-out head 3. Thus, the stand-by time T2 of γ seconds is set in order to provide a time required for the worker to make a correct determination.

The deviation clearing section 21 performs deviation clearing operation to bring the deviations computed in the servo system control section 13 for the servomotors to zero with the servo system control section 13 kept on when the operation stop command is output from the collision detection section 19. In the present embodiment, as illustrated in (D) in FIG. 2, clearing operation is performed again [see (D) in FIG. 2] when a movement command [see (A) in FIG. 2] is input again through a manual operation.

With the control system according to the present embodiment, the deviation clearing section 21 performs clearing operation to bring the deviations in the servo system control section to zero with the servo system control section kept on when the operation stop command is output from the collision detection section 19. Therefore, positioning is completed as the deviations are brought to zero, which enables operation corresponding to the manual command to be performed again. If the deviations are not brought to zero, operation for the deviations is performed prior to a manual command for retracting operation. This operation may damage the take-out head 3. In the present embodiment, however, such a problem is not caused. In the present embodiment, when an escaping operation is performed after the operation is stopped, the servomotors 9 can be operated according to an operation command from the input section 23 to move the vertical frame 5 (take-out head 3), which allows smooth retraction from the collision state.

Figure 4:
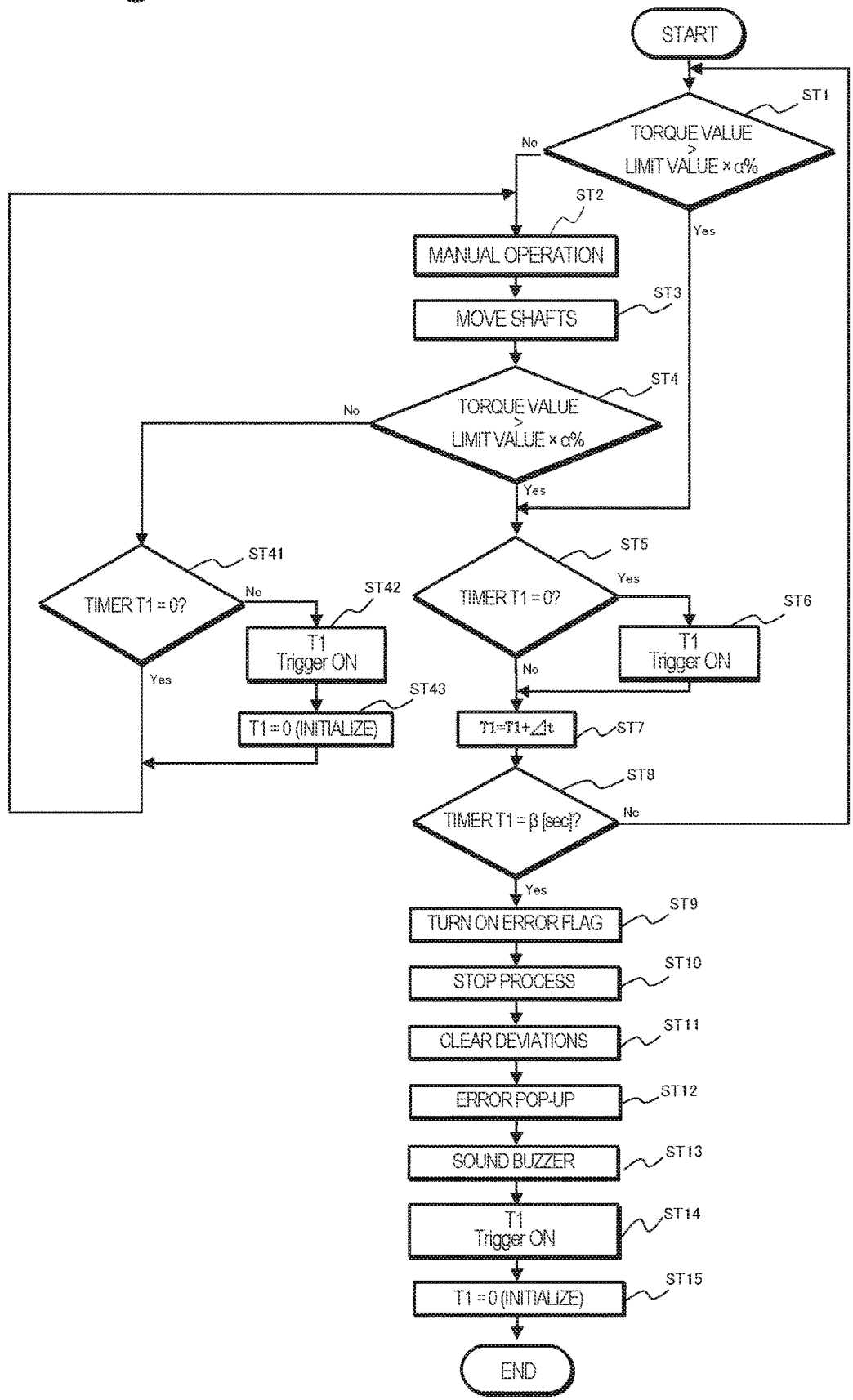
FIG. 4 is the actual flow of operation at the time when a collision is detected.

FIG. 4 is the actual flow of operation at the time when a collision is detected. In step ST1, it is determined whether or not the torque value is larger than a predetermined value (limit value×α %). When the determination result is No, a manual operation is executed in step ST2, and the shafts are moved by driving the servomotors 9 in step ST3. Then, in step ST4, it is determined again whether or not the torque value is larger than the predetermined value (limit value×α %). When the determination result is Yes, the process proceeds to step ST5, where it is determined whether the time T1 of a timer is zero. When the determination result is Yes, the timer starts counting in step ST6, and the process proceeds to step ST7. The process proceeds to step ST7 also when the result of the determination in step ST5 is No, and the timer continues counting. Next, in step ST8, it is determined whether or not the time T1 of the timer is β. If it is β, the process proceeds to step ST9. The process returns to step ST1 if the determination result is No. If the result of the determination in step ST4 is No, the process proceeds to step ST41. It is determined whether or not the time T1 of the timer is zero. If the determination result is No, the timer is turned off in step ST42, the time T1 of the timer is brought to zero in step ST43, and the process returns to step ST2. The process returns to step ST2 also when the result of the determination in step ST41 is Yes. If it is determined in step ST8 that the time T1 of the timer has been brought to the error flag is turned on in step ST9, and the stop process is executed in step ST10. After that, the deviations are cleared in step ST11, an error pop-up (error indication) is displayed as an alarm in step ST12, and a buzzer is sounded as an alarm in step ST13. After that, the timer is turned off in step ST14, and the time T1 of the timer is brought to zero in step ST15. Through the operation described above, the deviations are reset with the servo system control section kept on after a collision is detected.

Figure 5:
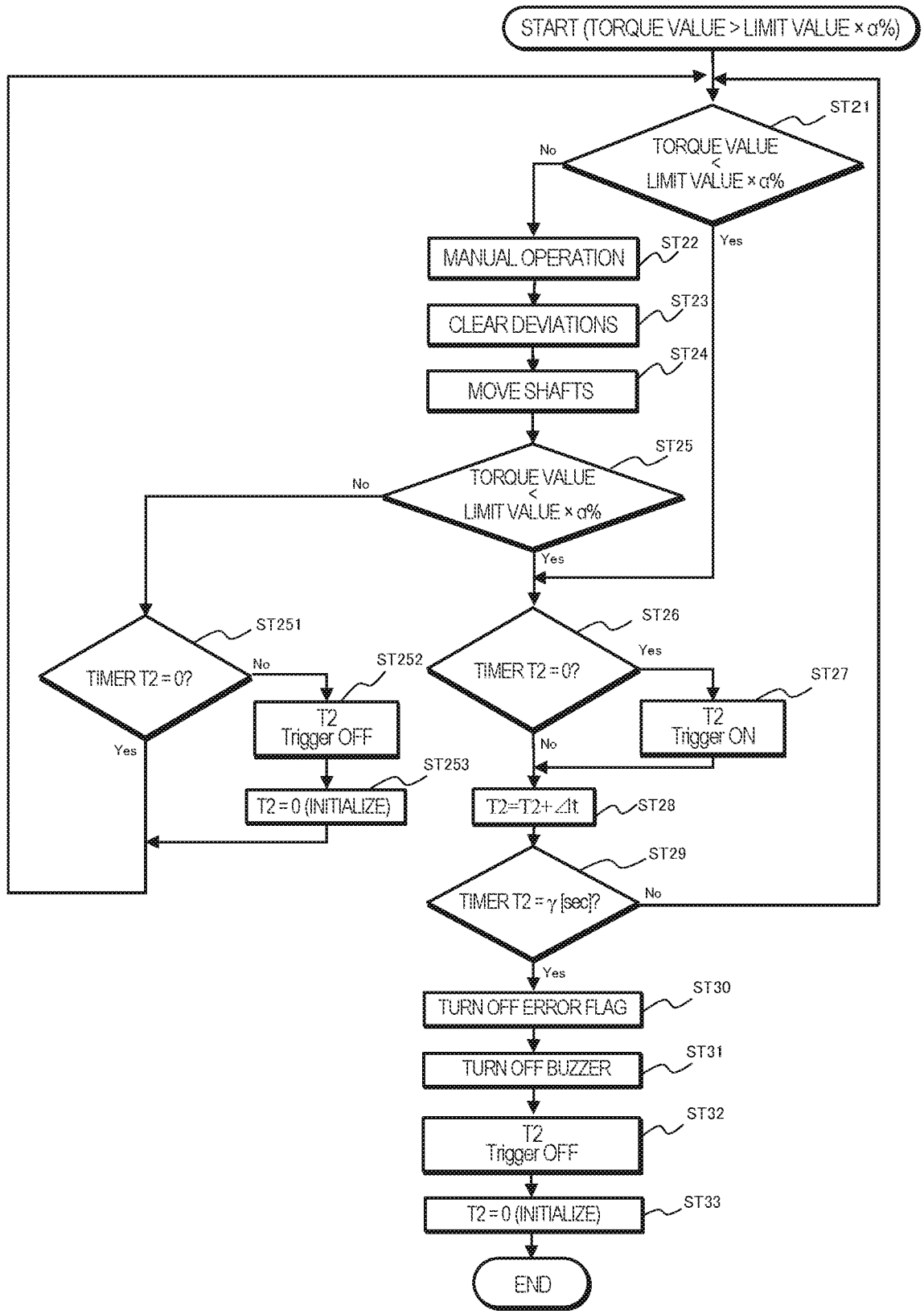
FIG. 5 is the actual flow of operation for collision retraction.

FIG. 5 is the flow of operation for collision retraction. In this example, collision retraction is performed when the torque value is larger than the limit value×α % at the start. In step ST21, it is determined whether or not the torque value is smaller than the limit value×α %. When the torque value is not smaller than (is equal to or more than) the limit value×α %, the process proceeds to step ST22, where a manual operation is executed. In step ST23, the deviations are cleared, and the operation stop command is turned off. In step ST24, the shafts are moved by driving the servomotors. After that, in step ST25, it is determined whether or not the torque value is smaller than the limit value×α %. When the torque value is smaller than the limit value×α %, the process proceeds to step ST26, where it is determined whether or not the time T2 of the timer is zero. When the time T2 of the timer is zero, the timer starts counting in step ST27. When the time T2 of the timer is not zero, the timer continues counting in step ST28. When the torque value is not smaller than the limit value×α % in step ST25, the process proceeds to step ST251, where it is determined whether or not the time T2 of the timer is zero. If the time T2 of the timer is zero, the process returns to step ST21. If the time T2 of the timer is not zero, the process proceeds to step ST252, where the timer is turned off. The timer period T2 is brought to zero (initialized) in step ST253, and the process returns to step ST21. It is determined in step ST29 whether or not the time of the timer has been brought to γ after the timer counts the time in step ST28. If the determination result is No, the process returns to step ST21. If the determination result is Yes, the process proceeds to step ST30 for collision retraction operation, where the error flag is turned off. The buzzer is turned off in step ST31, counting of the time T2 of the timer is turned off in step ST32, and the time T2 of the timer is brought to zero (initialized) in step ST33. Consequently, retraction from the collision state has been made.

[Modifications]

Preferably, the torque detection section is configured to detect the action direction of torque that acts on the take-out head from a variety of directions. When servomotors are provided for a large number of axes such as five axes and six axes, for example, the torque detection section may be configured to detect torque for all the large number of axes. When the take-out head is mounted to a posture controller, the torque detection section may be configured to detect torque applied from the posture controller to the take-out head as well. Preferably, the display portion of the input section that is used to perform a manual operation is configured to display all the torque indications that are proportional to the magnitude of the torque detected by the torque detection section. Such torque indications may be displayed in any manner such as numerical display, bar-graph display, and meter display. Preferably, the display portion of the input section is configured to display a suggestion indication adjacent to the torque indication, the suggestion indication suggesting the direction of retraction. This suggestion may be any of a text indication, a mark indication, a lamp indication, etc.

INDUSTRIAL APPLICABILITY

With the present invention, the deviation clearing section performs clearing operation to bring the deviations in the servo system control section to zero with the servo system control section kept on when the operation stop command is output. Therefore, positioning is completed as the deviations are brought to zero, which enables operation to be performed again. As a result, when a retracting operation is performed after the operation is stopped, the servomotor can be operated according to an operation command to move the vertical frame and the take-out head, which allows smooth retraction from the collision state.

What is claimed is:

1. A control method for an apparatus for taking out a molded product, comprising:
   detecting, using an encoder, a position and a speed of a drive portion of a servomotor operable to drive a frame including a take-out head of the apparatus, calculating a deviation between a detected value of the position and a value of a position command and a deviation between a detected value of the speed and a value of a speed command, and controlling the servomotor by performing feedback control on the position and the speed of the drive portion using the deviations;
   generating a manual command for manually operating a servo system control section;
   detecting torque applied to the frame when the servomotor is manually operated by providing an operation command to the servo system control section according to the manual command;
   outputting an operation stop command by assuming that the take-out head has collided with a peripheral object when a detected torque value becomes larger than a predetermined value;
   performing a clearing operation to bring the deviations in the servo system control section to zero with the servo system control section kept on when the operation stop command is output;
   detecting an action direction of torque that acts on the take-out head;
   display the action of the torque and a torque indication that is proportional to a magnitude of the torque; and
   displaying a suggestion indication adjacent to the torque indication, the suggestion indication suggest direction of retraction.

2. The control method for an apparatus for taking out a molded product according to claim 1, comprising:
   setting the predetermined value to a value that is smaller than a limit value during automatic operation.

3. The control method for an apparatus for taking out a molded product according to claim 2, comprising
   outputting the operation stop command by assuming that the take-out head has collided with the peripheral object when the detected torque value is larger than the predetermined value continuously for a predetermined amount of time.

4. The control method for an apparatus for taking out a molded product according to claim 3, comprising:
   outputting an alarm signal almost at the same time as outputting the operation stop command, and continuously outputting the alarm signal until a predetermined time elapses after a movement command is input again while the take-out head is retracting after a collision has been detected and the detected torque value becomes smaller than the predetermined value.

5. The control method for an apparatus for taking out a molded product according to claim 4, comprising:
   performing the clearing operation again when the movement command is input again.

6. The control method for an apparatus for taking out a molded product according to claim 2, comprising:
   detecting an action direction of torque that acts on the take-out head; and displaying the action direction of the torque and a torque indication that is proportional to a magnitude of the torque.

7. The control method for an apparatus for taking out a molded product according to claim 6, comprising:
displaying a suggestion indication adjacent to the torque indication, the suggestion indication suggesting a direction of retraction.

8. The control method for an apparatus for taking out a molded product according to claim 6, comprising:
detecting torque in a transverse direction, torque in a pull-put direction, and torque in a vertical direction that act on the take-out head; and
displaying three torque indications that are proportional to a magnitude of the torque in the transverse direction, a magnitude of the torque in the pull-put direction, and a magnitude of the torque in the vertical direction.

9. The control method for an apparatus for taking out a molded product according to claim 1, comprising:
outputting the operation stop command by assuming that the take-out head has collided with the peripheral object when the detected torque value is larger than the predetermined value continuously for a predetermined mount of time.

10. The control method for an apparatus for taking out a molded product according to claim 9, comprising:
detecting an action direction of torque that acts on the take-out head; and
displaying the action direction of the torque and a torque indication that is proportional to a magnitude of the torque.

11. The control method for an apparatus for taking out a molded product according to claim 10, comprising:
displaying a suggestion indication adjacent to the torque indication, the suggestion indication suggesting a direction of retraction.

12. The control method fem for an apparatus for taking out a molded product according to claim 10, comprising:
detecting torque in a transverse direction, torque in a pull-put direction, and torque in a vertical direction that act on the take-out head; and
displaying three torque indications that are proportional to a magnitude of the torque in the transverse direction, a magnitude of the torque in the pull-put direction, and a magnitude of the torque in the vertical direction.

13. The control method for an apparatus for taking out a molded product according to claim 9, comprising:
outputting an alarm signal almost at the same time as outputting the operation stop command, and continuously outputting the alarm signal until a predetermined time elapses after a movement command is input again while the take-out head is retracting after a collision has been detected and the detected torque value becomes smaller than the predetermined value.

14. The control method for an apparatus for taking out a molded product according to claim 13, comprising:
detecting an action direction of torque that acts on the take-out head; and
displaying the action direction of the torque and a torque indication that is proportional to a magnitude of the torque.

15. The control method for an apparatus for taking out a molded product according to claim 13, comprisings:
performing the clearing operation again when the movement command is input again.

16. The control method for an apparatus for taking out a molded product according to claim 15, comprising:
detecting an action direction of torque that acts on the take-out head; and
displaying the action direction of the torque and a torque indication that is proportional to a magnitude of the torque.

17. The control method for an apparatus for taking out a molded product according to claim 1, comprising:
detecting a torque in a transverse direction, torque in a pull-put direction, and torque in a vertical direction that act on the take-out head; and
displaying three torque indications that are proportional to a magnitude of the torque in the transverse direction, a magnitude of the torque in the pull-put direction, and a magnitude of the torque in the vertical direction.

18. The control method for an apparatus for taking out a molded product according to claim 17, comprising:
displaying three suggestion indications adjacent to the three torque indications, the suggestion indications each suggesting a direction of retraction.

* * * * *